Patented Apr. 20, 1926.

1,581,798

UNITED STATES PATENT OFFICE.

SUSIE E. FRASIER, OF SEATTLE, WASHINGTON.

TOPICAL REMEDY.

No Drawing.   Application filed October 20, 1923. Serial No. 669,711.

*To all whom it may concern:*

Be it known that I, SUSIE E. FRASIER, a citizen of the United States, residing at Seattle, in the county of King and State of Washington, have invented certain new and useful Improvements in Topical Remedies, of which the following is a specification.

The primary aim and object of this invention is the provision of a topical remedy or composition of matter especially adaptable for use in the treatment of enlargements and inflammation of the small membranous sacs of the feet commonly known as bunions and in the treatment of soft corns, wherein the germicidal and inhibitory action of said remedy destroys the cause of infection permitting the healing properties thereof to function and rapidly heal the local affected part.

In carrying out the invention the topical remedy consists of the following ingredients or components, compounded or combined together in substantially the following proportions:—a solution of phenol (carbolic acid) one part; and tincture of myrrh two parts.

The phenol acts as an active germicidal and antiseptic and readily penetrates the epidermis opening up the pores thereof, while, the tincture of myrrh enters the pores so opened and has a gentle and long continued rubefacient and soothing effect upon the epidermal tissue counteracting any irritant effect which may be caused by the phenol. If used singly neither ingredient will produce the desired effect, but, when both are compounded to function together, such compound possesses the desired and necessary healing properties.

In use the local affected part is first thoroughly cleansed whereupon the topical remedy is applied directly to the said affected part. By consistent and continued use and application of the remedy as stated, enlargements or inflammation will quickly subside in the case of bunions or soft corns.

While I have herein described my invention with sufficient detail to enable those skilled in the art to understand the composition and advantages accruing from the use thereof, it is to be understood that there is no intentional limitation herein to the specific ingredients and precise percentages described, except as expressly defined by the appended claims, and various modifications of said ingredients and percentages may be resorted to without departing from the invention or the benefits derivable therefrom.

Having thus fully described my invention what I claim as new and desire to secure by Letters Patent of the United States is:—

1. A topical remedy of the class described consisting of a solution of phenol and tincture of myrrh.

2. A topical remedy of the class described consisting of a ten per cent solution of phenol one part, and tincture of myrrh two parts.

In testimony whereof I affix my signature.

SUSIE E. FRASIER.